US010417485B2

(12) United States Patent
Ju et al.

(10) Patent No.: US 10,417,485 B2
(45) Date of Patent: Sep. 17, 2019

(54) METHOD AND MODULE OF GESTURE RECOGNITION

(71) Applicant: Wistron Corporation, New Taipei (TW)

(72) Inventors: Ting-Feng Ju, New Taipei (TW); Yu-Yen Chen, New Taipei (TW); Chih-Hao Chiu, New Taipei (TW); You-Jyun Syu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/853,840

(22) Filed: Dec. 24, 2017

(65) Prior Publication Data

US 2019/0005316 A1 Jan. 3, 2019

(30) Foreign Application Priority Data

Jun. 28, 2017 (TW) .............................. 106121562 A (51) Int. Cl.
| | |
|---|---|
| *G06K 9/46* | (2006.01) |
| *G06K 9/00* | (2006.01) |
| *G06F 3/01* | (2006.01) |
| *G06T 7/20* | (2017.01) |
| *G06K 9/52* | (2006.01) |

(52) U.S. Cl.
CPC ......... *G06K 9/00355* (2013.01); *G06F 3/017* (2013.01); *G06K 9/46* (2013.01); *G06K 9/52* (2013.01); *G06T 7/20* (2013.01)

(58) Field of Classification Search
None
See application file for complete search history.

(56) References Cited

U.S. PATENT DOCUMENTS

| | | | |
|---|---|---|---|
| 2013/0044183 A1* | 2/2013 | Jeon ..................... | H04N 19/103 348/43 |
| 2014/0002647 A1* | 1/2014 | Xu .......................... | H04N 7/18 348/143 |
| 2014/0368455 A1* | 12/2014 | Croisonnier .......... | G06F 3/0414 345/173 |
| 2015/0006106 A1* | 1/2015 | Ishikawa ................ | G01P 13/04 702/150 |

FOREIGN PATENT DOCUMENTS

| | | |
|---|---|---|
| CN | 105718776 A | 6/2016 |
| TW | 201019241 A1 | 5/2010 |
| TW | 201510781 A | 3/2015 |

* cited by examiner

*Primary Examiner* — Eileen M Adams
(74) *Attorney, Agent, or Firm* — Winston Hsu (57) ABSTRACT

A gesture recognition method includes determining whether an object stays within a plurality of video frames for more than a specific time; determining a finger number corresponding to the object to generate a finger number determination result, and determining whether or not the object moves away from a light sensing unit to generate an object moving-away determination result, when the object stays within the plurality of video frames for more than the specific time; and determining a gesture of a user according to the finger number determination result and the object moving-away determination result.

24 Claims, 10 Drawing Sheets

METHOD AND MODULE OF GESTURE RECOGNITION

BACKGROUND OF THE INVENTION

1. Field of the Invention

The present invention relates to a gesture recognition method and a gesture recognition module, and more particularly, to a gesture recognition method and a gesture recognition module capable of preventing mistaking a trigger or mistaking determination among different gestures.

2. Description of the Prior Art

Due to the convenience of gesture recognition, gesture recognition technology is valued by the industry. There are two types of lenses that can be used for gesture recognition: a long-range lens and a short-range lens. The long-range lens can be set in front of the user to face the user, for example, be set on the television or the game console, and the short-range lens can be disposed in a wearable device. Although both types of lenses can be used for recognizing gestures, these two types of lenses would have different gestures recognized, since the gestures information obtained and user habits are different because of different distance/location.

With the development of virtual reality (VR) device, the short-range lens can be disposed on the VR device. For the short-range lens disposed on the VR device, since the lens usually moves with the user, it is not easy to obtain the moving information of hand and the dynamic gesture of the user. In addition, when the gesture of the user is dynamic, mistaking a trigger or mistaking determination might happen if using conventional gesture recognition technology.

Therefore, it is necessary to improve the prior art.

SUMMARY OF THE INVENTION

It is therefore a primary objective of the present disclosure to provide a gesture recognition method and a gesture recognition module capable of preventing mistaking a trigger or mistaking determination among different gestures, to improve over disadvantages of the prior art.

An embodiment of the present disclosure discloses a gesture recognition method, applied in a gesture recognition module, configured to determine a gesture of a user, wherein the gesture recognition module comprises a light sensing unit, and the light sensing unit generates a plurality of video frames, the gesture recognition method comprising determining whether or not a time of an object staying within the plurality of video frames is greater than a specific time; determining a finger number corresponding to the object to generate a finger number determination result and determining whether or not the object moves away from the light sensing unit to generate an object moving-away determination result when the time of the object staying within the plurality of video frames is greater than the specific time; and determining the gesture of the user according to the finger number determination result and the object moving-away determination result.

An embodiment of the present disclosure discloses a gesture recognition module comprising a light emitting unit, configured to emit an incident light; a light sensing unit, configured to receive a reflected light corresponding to the incident light, and generate a plurality of video frames according to the reflected light; a determining unit, coupled to the light sensing unit, configured to execute the following steps to determine a gesture of a user according to the plurality of video frames: determining whether or not a time of an object staying within the plurality of video frames is greater than a specific time; determining a finger number corresponding to the object to generate a finger number determination result and determining whether or not the object moves away from the light sensing unit to generate an object moving-away determination result when the time of the object staying within the plurality of video frames is greater than the specific time; and determining the gesture of the user according to the finger number determination result and the object moving-away determination result.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
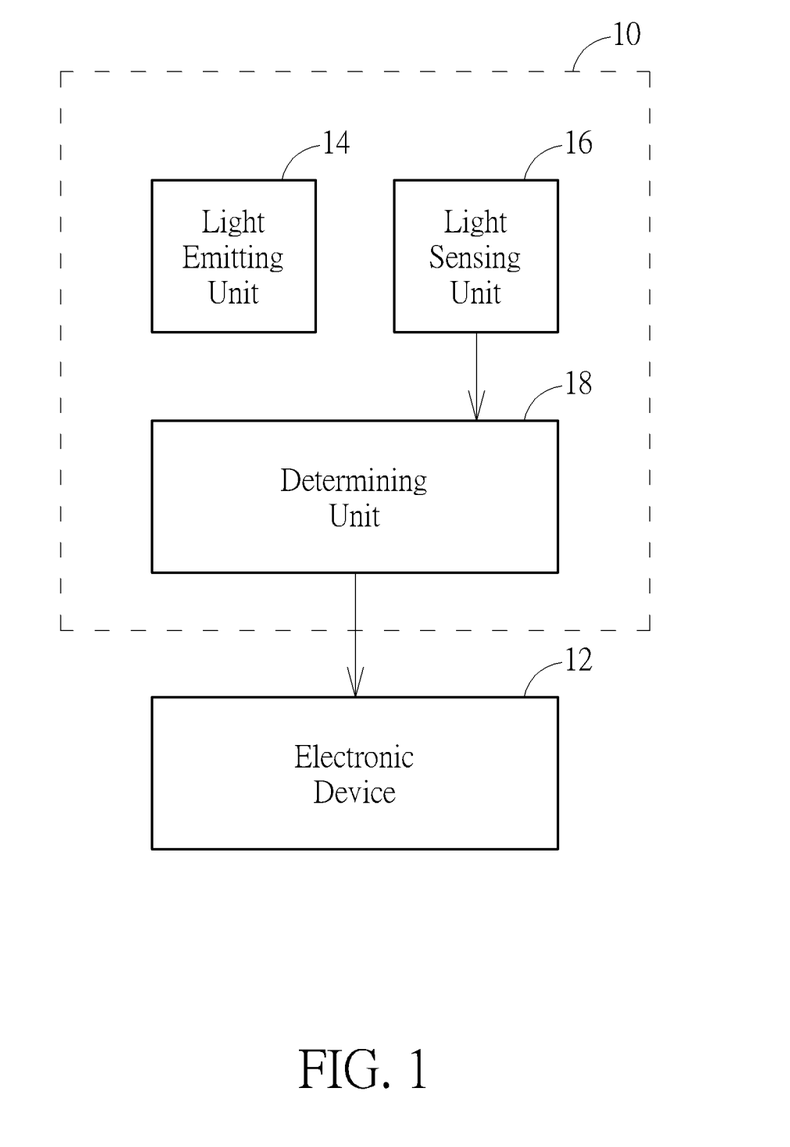
FIG. 1 is a functional block diagram of a gesture recognition module according to an embodiment of the present invention.
Figure 2:
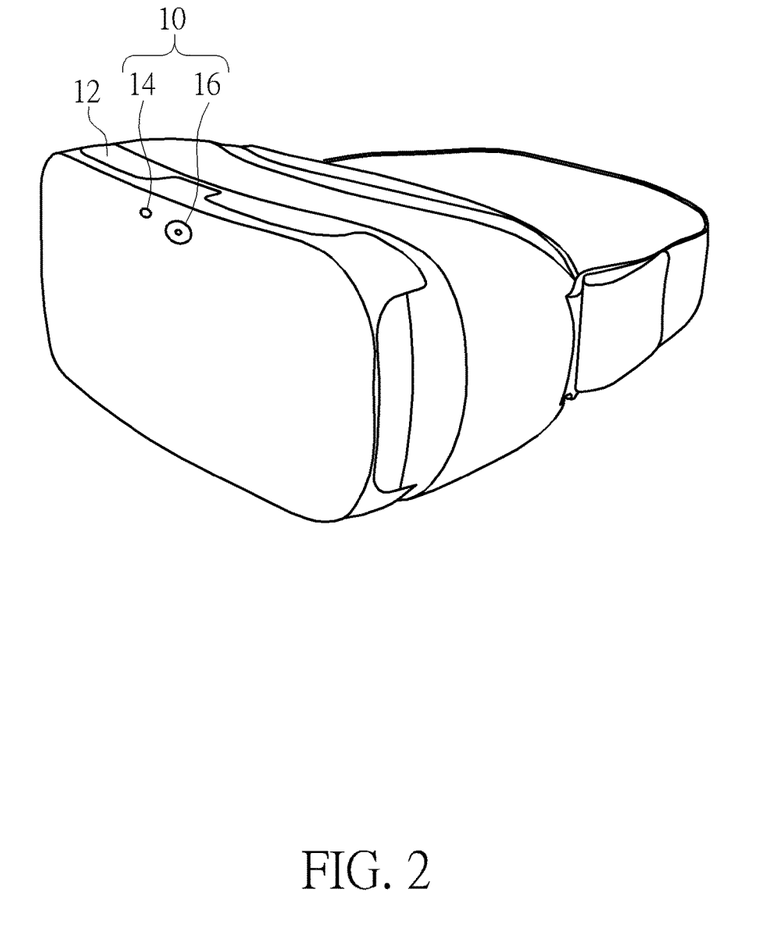
FIG. 2 is an appearance diagram of an electronic device on which the gesture recognition module in FIG. 1 is disposed.

Please refer to FIG. 1 and FIG. 2. FIG. 1 is a functional block diagram of a gesture recognition module 10 according to an embodiment of the present invention. FIG. 2 is an appearance diagram of an electronic device 12 on which the gesture recognition module 10 is disposed. The gesture recognition module 10 is coupled to the electronic device 12. The electronic device 12 may be a virtual reality (VR) device. The gesture recognition module 10 may be disposed in the front of the electronic device 12. When a user wears the electronic device 12, the gesture recognition module 10 may recognize the gesture of the user, and the electronic device 12 may perform a computation or operation according to the gesture recognized by the gesture recognition module 10.

Specifically, the gesture recognition module 10 includes a light emitting unit 14, a light sensing unit 16 and a determining unit 18. The light emitting unit 14 is configured to emit an incident light, and may be an invisible light emitting device, e.g., an infrared ray light emitting diode (IR LED). The light sensing unit 16 is configured to receive a reflected light corresponding to the incident light emitted by the light emitting unit 14, and may include a lens and an invisible light sensing device (e.g., IR photo diode). In other words, the light sensing unit 16 may generate a plurality of video frames FR according to the reflected light corresponding to the incident light from the light emitting unit 14. The determining unit 18, coupled to the light sensing unit 16, receives the plurality of video frames FR to determine the gesture of the user according to the plurality of video frames FR. When the determining unit 18 finishes the gesture recognition, the determining unit 18 may send the gesture recognition result to the electronic device 12 and the electronic device 12 would perform a relative computation or operation according to the gesture recognized by the gesture recognition module 10.

Figure 3:
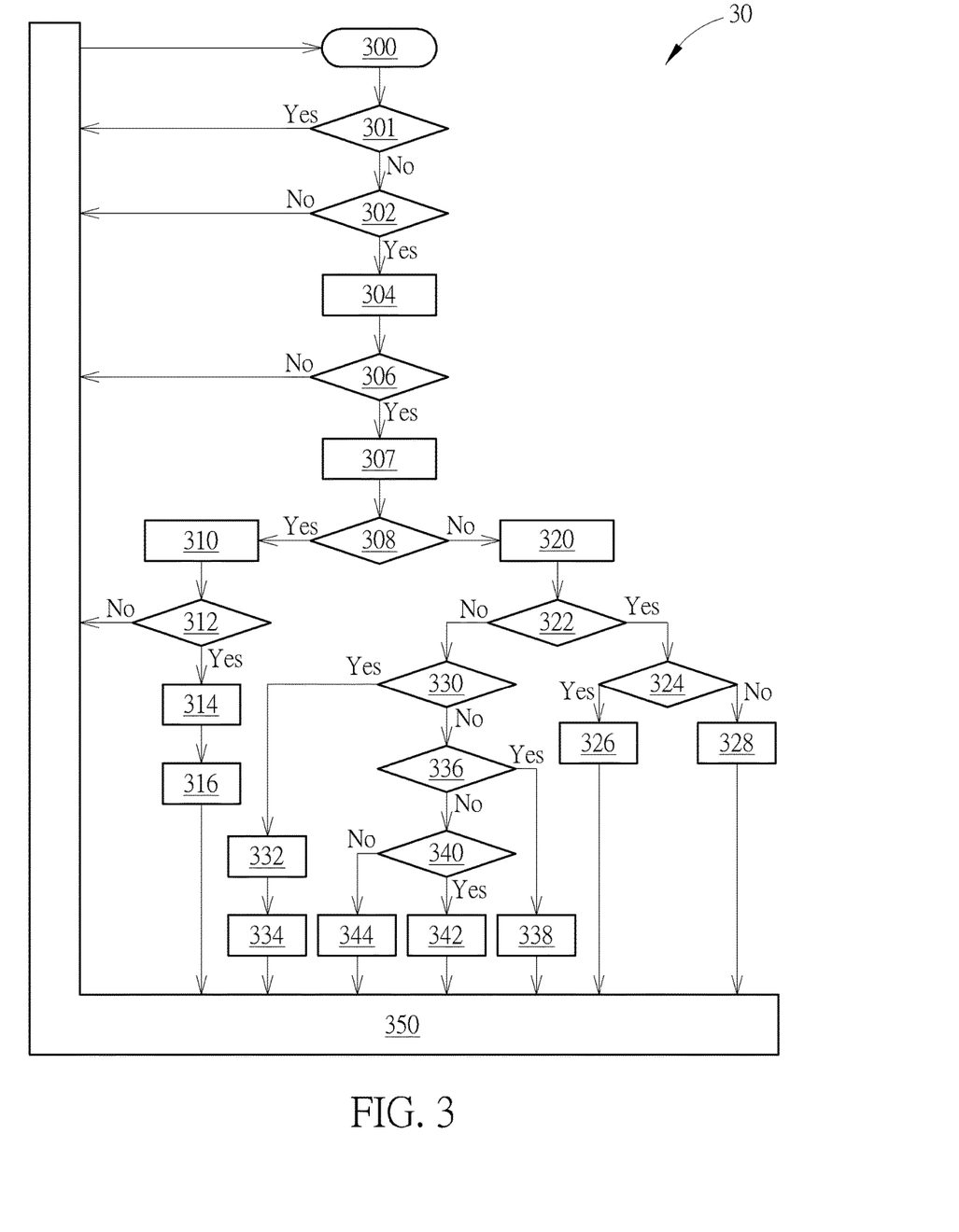
FIG. 3 is a schematic diagram of a gesture recognition process according to an embodiment of the present invention.

Please refer to FIG. 3 to see operations of the determining unit 18 determining the gesture of the user according to the plurality of video frames FR. FIG. 3 is a schematic diagram of a gesture recognition process 30 according to an embodiment of the present invention. The gesture recognition process 30 is executed by the determining unit 18, which comprises the following steps:

Step 300: Receive a video frame $FR_i$.

Step 301: Determine whether a delay flag DLF is 1. If yes, go to Step 350; otherwise, go to Step 302.

Step 302: Determine whether the video frame $FR_i$ includes an object OBJ. If yes, go to Step 304; otherwise, go to Step 350.

Step 304: Obtain a binarized image $BFR_i$ corresponding to the video frame $FR_i$, an outer frame Bx of the object OBJ in the binarized image $BFR_i$, and an outer frame center Bx_cnt of the outer frame Bx.

Step 306: Determine whether or not a time of the object OBJ staying within the plurality of video frames FR is greater than a specific time. If yes, go to Step 307; otherwise, go to Step 350.

Step 307: Determine a finger number fgr_no corresponding to the object OBJ.

Step 308: Determine whether the finger number fgr_no is 1. If yes, go to Step 310; otherwise, go to Step 320.

Step 310: Determine that the gesture of the user is corresponding to a single finger cursor operation.

Step 312: Determine whether or not the object OBJ moves away from the light sensing unit 16. If yes, go to Step 314; otherwise, go to Step 350.

Step 314: Determine that the gesture of the user is corresponding to a single finger cursor click operation.

Step 316: Set the delay flag DLF as 1 within a time t1, and set the delay flag DLF as 0 after the time t1.

Step 320: Compute a moving track TRK of the object OBJ according to the outer frame center Bx_cnt.

Step 322: Determine whether the object OBJ is static according to the moving track TRK of the object OBJ. If yes, go to Step 324; otherwise, go to Step 330.

Step 324: Determine in the binarized image $BFR_i$ whether or not the object OBJ enters the video frame $FR_i$ horizontally. If yes, go to Step 326; otherwise, go to Step 328.

Step 326: Determine the gesture of the user as a movement of shaking up-and-down on a side.

Step 328: Determine the gesture of the user as a movement of raising right hand or a movement of raising left hand.

Step 330: Determine whether or not the object OBJ moves away from the light sensing unit 16. If yes, go to Step 332; otherwise, go to Step 336.

Step 332: Determine the gesture of the user as a pushing movement.

Step 334: Set the delay flag DLF as 1 within a time t2, and set the delay flag DLF as 0 after the time t2.

Step 336: Determine whether the object OBJ moves vertically in constant speed. If yes, go to Step 338; otherwise, go to Step 340.

Step 338: Determine the gesture of the user as an upward movement in constant speed or a downward movement in constant speed.

Step 340: Determine whether the object OBJ swings left-and-right. If yes, go to Step 342; otherwise, go to Step 344.

Step 342: Determine the gesture of the user as a left-and-right swinging movement.

Step 344: Determine the gesture of the user as a clockwise waving movement or a counterclockwise waving movement.

Step 350: Set i=i+1, and go to Step 300.

The gesture recognition process 30 shown in FIG. 3 is a frame-based gesture recognition process. In other words, when the determining unit 18 receives a video frame $FR_i$ of the plurality of video frames FR from the light sensing unit 16, the determining unit 18 would execute the gesture recognition process 30 once. When the determining unit 18 receives next video frame $FR_{i+1}$ from the light sensing unit 16, the determining unit 18 would again execute the gesture recognition process 30, and so on and so forth, until the gesture recognition module 10 no longer performs the gesture recognition according to the video frame FR.

By the gesture recognition process 30, the determining unit 18 may determine the gesture of the user as the movement of shaking up-and-down on the side, the movement of raising right hand, the movement of raising left hand, the pushing movement, the upward movement in constant speed, the downward movement in constant speed, the left-and-right swinging movement, the clockwise waving movement or the counterclockwise waving movement. In addition, the determining unit 18 may determine whether the gesture of the user is corresponding to the single finger cursor operation or the single finger cursor click operation according to the plurality of video frames FR. According to the gesture recognition process 30, the present disclosure may prevent mistaking a trigger or mistaking determination among different movement and enhance an accuracy of the gesture recognition, so as to prevent the electronic device 12 performing wrong operation.

In Step 302, the determining unit 18 determines whether the video frame $FR_i$ includes the object OBJ. Specifically, in an embodiment, the determining unit 18 may determine whether the video frame $FR_i$ includes the object OBJ according to pixel values corresponding to the invisible light (e.g., IR) in the video frame $FR_i$. In an embodiment, when the pixel values corresponding to the invisible light in a block within the video frame $FR_i$ are all greater than a specific value, the determining unit 18 may determine that the video frame $FR_i$ includes the object OBJ.

Figure 4:
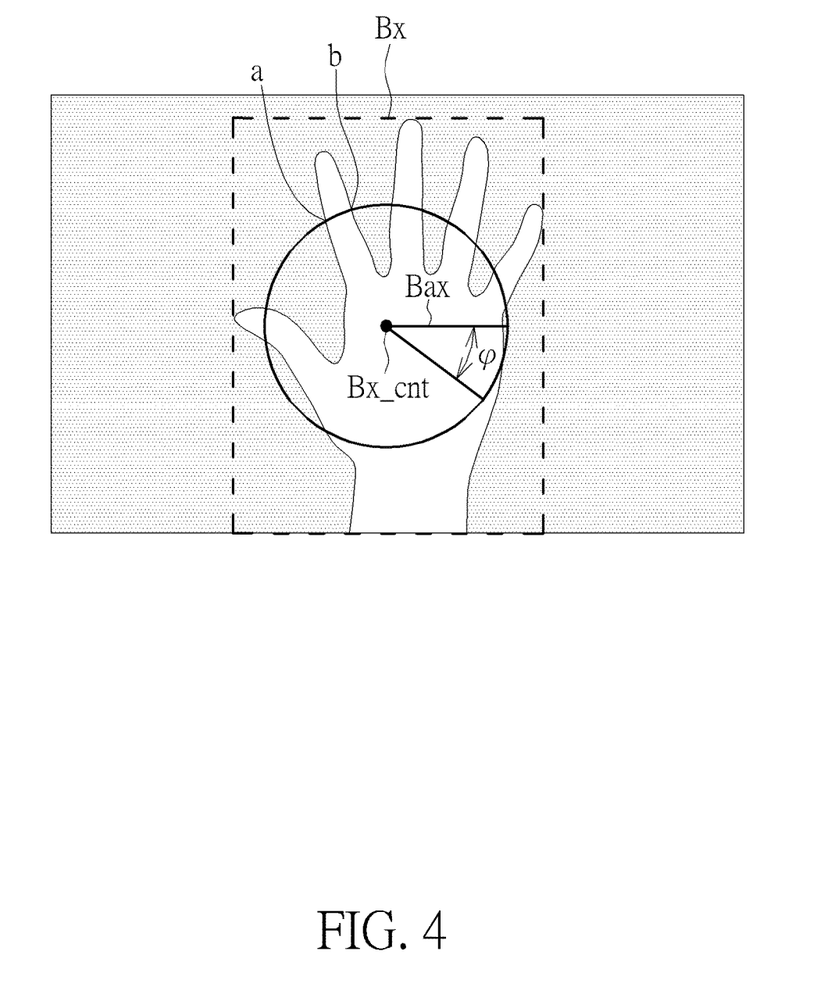
FIG. 4 is a schematic diagram of a binarized image according to an embodiment of the present invention.

When the determining unit 18 determines that the video frame $FR_i$ includes the object OBJ, in Step 304, the determining unit 18 may perform a binarization image process and an erosion image process on the video frame $FR_i$, to obtain the binarized image $BFR_i$ corresponding to the video frame $FR_i$, where each pixel value within the binarized image $BFR_i$ is either black or white. For example, please refer to FIG. 4. FIG. 4 is a schematic diagram of a binarized image BFR. White pixels in the binarized image BFR may represent the image corresponding to the object OBJ, i.e., the white pixels may be regarded as object pixels. The rest of the black pixels may represent the image corresponding to background of the object OBJ, i.e., the black pixels may be regarded as background pixels. In an embodiment, a pixel value corresponding to the white pixel may be 255, and a pixel value corresponding to the black pixel may be 0. In addition, in Step 304, the determining unit 18 obtains the outer frame Bx of the object OBJ in the binarized image $BFR_i$, and the outer frame center Bx_cnt of the outer frame Bx. In an embodiment, the outer frame Bx is a smallest rectangular surrounding the object OBJ (surrounding all the white pixels), and the outer frame center Bx_cnt is a central coordinate of the smallest rectangular.

In Step 306, the determining unit 18 determines whether or not the time of the object OBJ staying within the plurality of video frames FR is greater than the specific time (e.g., 1 second). In an embodiment, the determining unit 18 may review the video frame $FR_i$ and N video frames previous to the video frame $FR_i$ (which is to review the video frames $FR_{i-N+1}$-$FR_i$ among the plurality of video frames FR), and determine whether the video frames $FR_{i-N+1}$-$FR_i$ include the object OBJ, wherein a time difference corresponding to the video frames $FR_{i-N+1}$-$FR_i$ is the specific time. In another perspective, in an embodiment, the determining unit 18 may determine whether the time of the object OBJ staying within the plurality of video frames FR is greater than the specific time, according to how many video frames FR which include the object OBJ. In other words, When a number of the video frames FR which include the object OBJ is greater than a specific number N', the determining unit 18 determines that the time of the object OBJ staying within the plurality of video frames FR is greater than the specific time.

When the time of the object OBJ staying within the plurality of video frames FR is greater than the specific time, it represents that the user wants to control/operate the electronic device 12 by using the gesture, and thus, the determining unit 18 executes Step 307 to determine the finger number fgr_no corresponding to the object OBJ. To be easily understood the content of the present disclosure, the finger number fgr_no of the object OBJ is generally referred to a number of protruding parts of the object image (i.e., the image formed by white pixels in the binarized image BFR). That is, when the determining unit 18 performs the gesture recognition, the number of protruding parts corresponding to the object image in the binarized image BFR can be regarded/treated as the finger number fgr_no of the object OBJ. In addition, the determining unit 18 is not limited to using certain method to determine the finger number fgr_no corresponding to the object OBJ. In an embodiment, the determining unit 18 may determine a circle contour CCT on the binarized image $BFR_i$. An area of the circle contour CCT may be substantially the same as an area of a palm (of a hand) in the binarized image $BFR_i$, and a contour center (i.e., a center of the circle contour CCT) may be located at the outer frame center Bx_cnt. In addition, pixels on the circle contour CCT are called contour pixels, and each contour pixel may be corresponding to a rotation angle φ, where the rotation angle φ is a rotation angle of each contour pixel related to the contour center (Bx_cnt) and a basis axis Bax of the circle contour CCT. In this case, the determining unit 18 may calculate a transition number on the plurality of contour pixels with respect to the rotation angle φ corresponding to the contour center, and determine the finger number fgr_no corresponding to the object OBJ according to the transition number.

Figure 5:
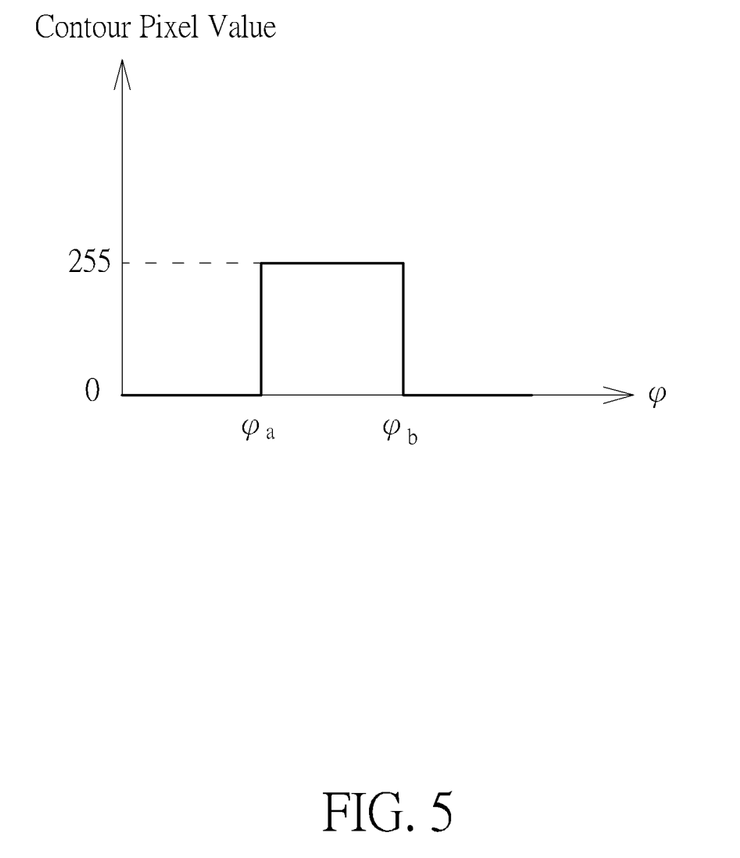
FIG. 5 illustrates a corresponding relationship of contour pixel values versus a rotation angle according to an embodiment of the present invention.

Specifically, the determining unit 18 may obtain a corresponding relationship diagram of the pixel values of the contour pixels versus the rotation angle φ, as shown in FIG. 5. The pixel values of the contour pixels vary as the rotation angle φ. For example, a point a on the circle contour CCT in FIG. 4 is corresponding to a rotation angle $φ_a$ in FIG. 5, and a point b on the circle contour CCT in FIG. 4 is corresponding to a rotation angle $φ_b$ in FIG. 5. The contour pixel at the point a would transit from black to white when the rotation angle φ rotates clockwise, and the corresponding contour pixel value at the point a would transit from 0 to 255. On the other hand, the contour pixel at the point b would transit from white to black when the rotation angle φ rotates clockwise, and the corresponding contour pixel value at the point b would transit from 255 to 0. When the rotation angle φ is 0°, the determining unit 18 may preset a transition number cnt as 0; when the rotation angle φ rotates within a range and the corresponding contour pixel value transits from 0 to 255 and transits from 255 to 0, the determining unit 18 would add 1 to the transition number cnt 1. In an embodiment, when the determining unit 18 rotates the rotation angle φ from 0° to 360°, the transition number cnt may represent the finger number fgr_no.

In addition, the determining unit 18 is not limited to using a certain method to determine the circle contour CCT. In an embodiment, the determining unit 18 may compute a center point C of the plurality of object pixels (i.e., the plurality of white pixels), obtain a farthest object pixel FOP among the plurality of object pixels which is the farthest from the center point C, compute a distance r between the center point C and the farthest object pixel FOP, and obtain a radius r. The determining unit 18 may determine the outer frame center Bx_cnt to be the center of the circle contour CCT, and the radius r to be the radius of the circle contour, where the radius r is smaller than the distance D and is a specific ratio of the distance D. For example, the radius r may be a half of the distance D, i.e., r=D/2, but not limited herein.

Figure 6:
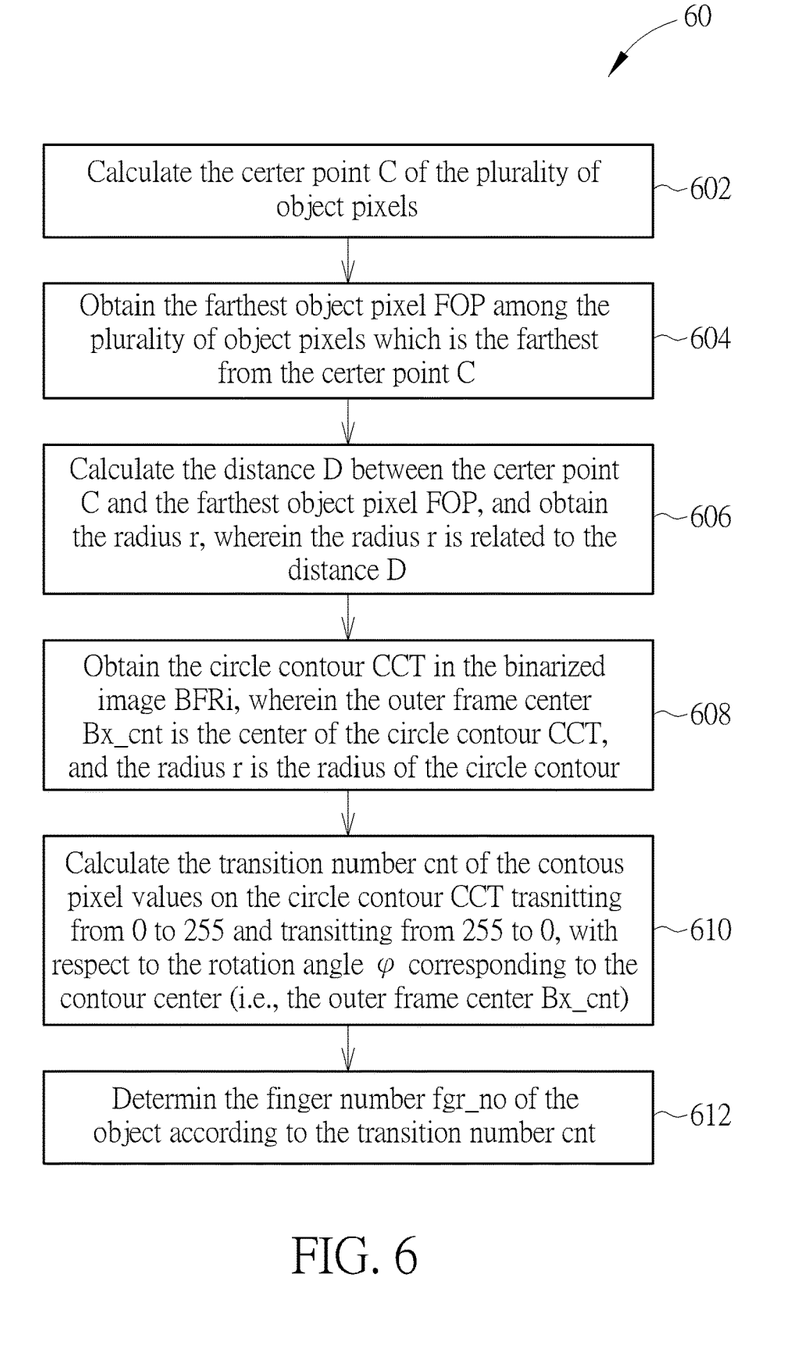
FIG. 6 is a schematic diagram of a finger number determining process according to an embodiment of the present invention.

Operation of the determining unit 18 determining the finger number fgr_no corresponding to the object OBJ may be summarized as a finger number determining process 60. As shown in FIG. 6, the process 60 comprises the following steps:

Step 602: Calculate the center point C of the plurality of object pixels.

Step 604: Obtain the farthest object pixel FOP among the plurality of object pixels which is the farthest from the center point C.

Step 606: Calculate the distance D between the center point C and the farthest object pixel FOP, and obtain the radius r, wherein the radius r is related to the distance D.

Step 608: Obtain the circle contour CCT in the binarized image $BFR_i$, wherein the outer frame center Bx_cnt is the center of the circle contour CCT, and the radius r is the radius of the circle contour.

Step 610: Calculate the transition number cnt of the contour pixel values on the circle contour CCT transmitting from 0 to 255 and transmitting from 255 to 0, with respect to the rotation angle φ corresponding to the contour center (i.e., the outer frame center Bx_cnt).

Step 612: Determine the finger number fgr_no of the object according to the transition number cnt.

When the determining unit 18 determines that the finger number fgr_no is 1, in Step 310, the determining unit 18 determines that the gesture of the user is corresponding to the single finger cursor operation. At this time, the determining unit 18 may generate a signal to instruct the electronic device 12 to perform a cursor operation. Furthermore, in Step 312, the determining unit 18 may determine whether or not the object OBJ moves away from the light sensing unit 16. In an embodiment, the determining unit 18 may obtain/compute a distance/depth of the object OBJ related to the light sensing unit 16 according to each video frame. For instance, the determining unit 18 may determine the distance/depth of the object OBJ related to the light sensing unit 16 according to a light strength of the reflected light. In addition, the determining unit 18 may review the video frame $FR_i$ and K video frames previous to the video frame $FR_i$ (which is to review the video frames $FR_{i-K+1}$-$FR_i$ of the plurality of video frames FR) and see if the distance of the object OBJ related to the light sensing unit 16 is in an increasing manner, so as to determine whether the object OBJ moves away from the light sensing unit 16.

When the determining unit 18 determines that the object OBJ moves away from the light sensing unit 16, in Step 314, the determining unit 18 determines that the gesture of the user is corresponding to the single finger cursor click operation. At this time, the determining unit 18 may generate a signal to instruct the electronic device 12 to perform a cursor click operation. Furthermore, when the determining unit 18 determines that the object OBJ moves away from the light sensing unit 16, it represents that the hand of the user pushes/moves forward. To prevent the gesture of the user from triggering unnecessary operation in the recovering movement (e.g., a movement of taking back the hand after pushing forward), after the determining unit 18 determines that the gesture of the user is corresponding to the single finger cursor click operation, in Step 316, the determining unit 18 sets the delay flag DLF as 1 within the time t1, and sets the delay flag DLF as 0 after the time t1. Therefore, when the next time the determining unit 18 performs Step 301, the determining unit 18 would stop performing gesture recognition on the video frames FR received within the time t1, so as to prevent from triggering unnecessary operation in the recovering movement when the user recovers back to original posture. In other words, after the determining unit 18 determines that the gesture of the user is corresponding to the single finger cursor click operation, the determining unit 18 would suspend (i.e., temporarily stop) determining the gesture of the user.

On the other hand, the determining unit 18 determines that the finger number fgr_no is not 1, in Step 320, the determining unit 18 computes the moving track TRK of the object OBJ according to the outer frame center Bx_cnt. In an embodiment, the determining unit 18 may record the outer frame centers Bx_cnt corresponding to the object OBJ in the video frames $FR_{i-K+1}$-$FR_i$, and computes the moving track TRK of the object OBJ according to the outer frame centers Bx_cnt corresponding to the video frames $FR_{i-K+1}$-$FR_i$. In another embodiment, the determining unit 18 may record the center points C of the plurality of object pixels in the video frames $FR_{i-K+1}$-$FR_i$, and computes the moving track TRK of the object OBJ according to the center points C corresponding to the video frames $FR_{i-K+1}$-$FR_i$. In an embodiment, the moving track TRK may record a moving momentum of the object OBJ between the video frames $FR_{k-1}$ and $FR_k$.

In Step 322, the determining unit 18 determines whether the object OBJ is static according to the moving track TRK of the object OBJ. In an embodiment, the determining unit 18 may check if the moving momentums between two video frames among the video frames $FR_{i-K+1}$-$FR_i$ are greater than a specific value m. If it is determined that the moving momentum is less the specific value m according to the moving track TRK, the determining unit 18 determines the object OBJ is static.

Figure 7:
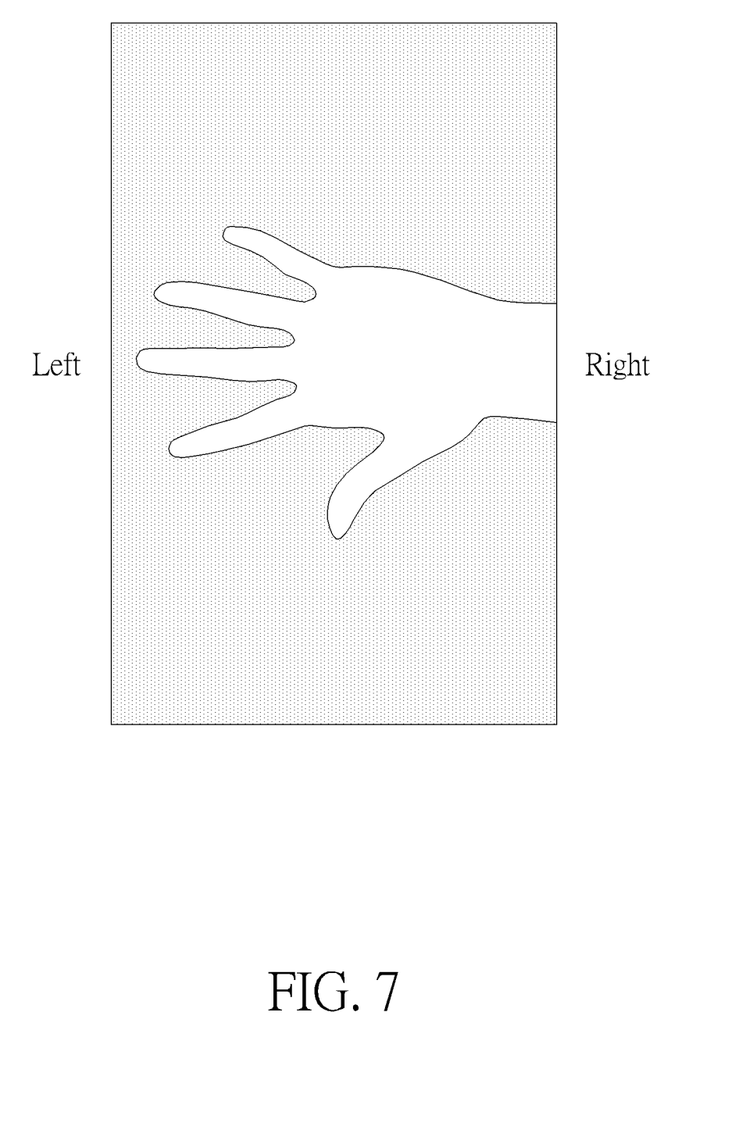
FIG. 7 is a schematic diagram of a binarized image according to an embodiment of the present invention.

In Step 324, the determining unit 18 determines in the binarized image $BFR_i$ whether or not the object OBJ enters the video frame $FR_i$ horizontally. In an embodiment, the determining unit 18 may determine a distribution of the plurality of object pixels in the binarized image $BFR_i$. If the plurality of object pixels are distributed at a right edge or a left edge of the binarized image $BFR_i$, but distributed neither at a top edge nor a bottom edge of the binarized image $BFR_i$, the determining unit 18 may determine that the object OBJ enters the video frames $FR_i$ horizontally. Please refer to FIG. 7. FIG. 7 is a schematic diagram of a binarized image BFR according to an embodiment of the present invention. Since the object pixels are distributed at a right edge of the binarized image BFR illustrated in FIG. 7, the determining unit 18 may determine the object OBJ enters the video frames horizontally according to the binarized image BFR illustrated in FIG. 7.

Figure 8:
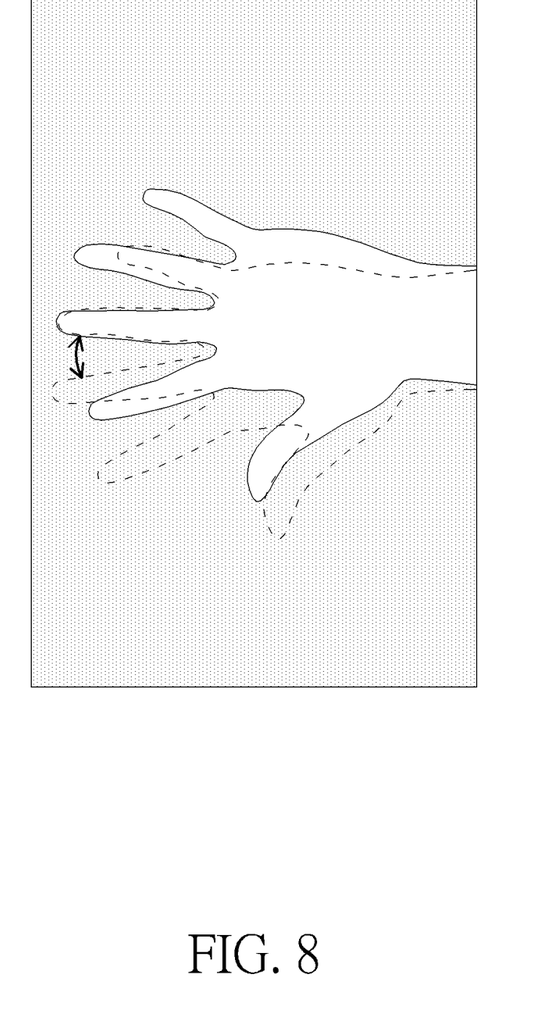
FIG. 8 is a schematic diagram of a movement of shaking up-and-down on a side according to an embodiment of the present invention.

When the determining unit 18 determines that in the binarized image $BFR_i$ the object OBJ enters the video frames $FR_i$ horizontally, in Step 326, the determining unit 18 may determine the gesture of the user as a movement of shaking up-and-down on the side (as shown in FIG. 8). At this time, the determining unit 18 may generate a signal to instruct the electronic device 12 to perform operation(s) corresponding to the movement of shaking up-and-down on the side. For example, when the determining unit 18 determines the gesture of the user as an upward movement on the side, the electronic device 12 may increase a volume thereof. On the contrary, when the determining unit 18 determines the gesture of the user as a downward movement on the side, the electronic device 12 may decrease the volume thereof, and not limited thereto.

Figure 9:
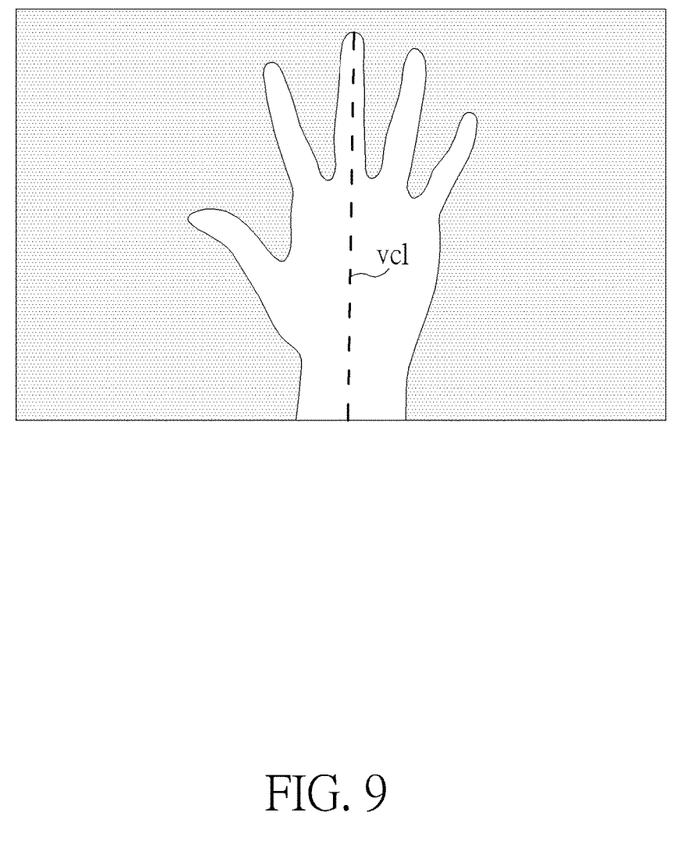
FIG. 9 is a schematic diagram of a binarized image according to an embodiment of the present invention.

When the determining unit 18 determines that the object OBJ does not horizontally enter the video frames $FR_i$, in Step 328, the determining unit 18 may determine the gesture of the user as the movement of raising right hand or the movement of raising left hand. In an embodiment, the binarized image $BFR_i$ may be partitioned in halves, as shown in FIG. 9. In FIG. 9, a central vertical line vcl partitions the binarized image BFR into a left half and a right half. When there are more object pixels in the right half, compared to the left half, of the binarized image BFR, the determining unit 18 may determine the gesture of the user as the movement of raising right hand, and vice versa, which is not limited herein.

When the determining unit 18 determines that the object OBJ is not static, in Step 330, the determining unit 18 determines whether or not the object OBJ moves away from the light sensing unit 16. Operation of Step 330 is the same as Step 312, and is not narrated herein for brevity.

When the determining unit 18 in Step 330 determines that the object OBJ moves away from the light sensing unit 16, in Step 332, the determining unit 18 the gesture of the user as the pushing movement. Similarly, executing Step 334 and Step 301 after executing Step 332 is to prevent from triggering unnecessary operation in the recovering movement when the user recovers back to original posture, which can be referred to the paragraphs stated in the above and not narrated herein. In other words, the determining unit 18 determines the gesture of the user as the pushing movement, the determining unit 18 would suspend determining the gesture of the user.

When the determining unit 18 in Step 330 determines that the object OBJ does not move away from the light sensing unit 16, in Step 336, the determining unit 18 determines whether the object OBJ moves vertically in constant speed. In an embodiment, the determining unit 18 may check if vertical components of the moving momentums between the video frames among the video frames $FR_{i-K+1}$-$FR_i$ are within a specific interval according to the moving track TRK of the object OBJ. For example, the determining unit 18 may determine if the vertical component of the moving momentum is less an upper bound v+δ and greater than a lower bound v−δ, where δ is much smaller than v. If yes, the determining unit 18 may determine that the object OBJ moves in a constant speed. When the determining unit 18 in Step 336 determines that the object OBJ moves vertically in constant speed, in Step 338, the determining unit 18 may determine the gesture of the user as the upward movement in constant speed or the downward movement in constant speed according to the moving track TRK of the object OBJ, and generate a signal to instruct the electronic device 12 to perform operation(s) corresponding to the upward movement inconstant speed or the downward movement in constant speed.

Figure 10:
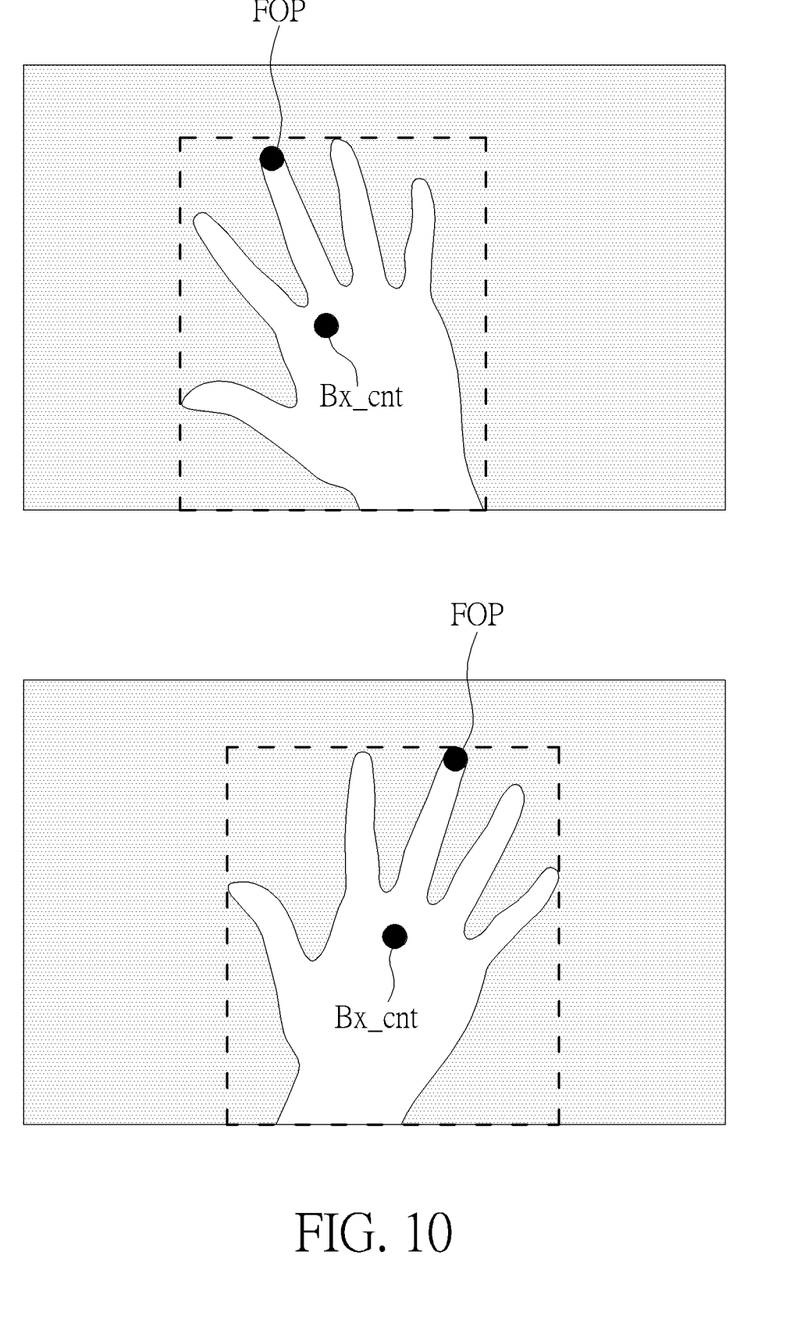
FIG. 10 is a schematic diagram of a binarized image according to an embodiment of the present invention.

When the determining unit 18 in Step 336 determines that the object OBJ does not move vertically in constant speed, in Step 340, the determining unit 18 may determine whether the object OBJ swings left-and-right. Specifically, the determining unit 18 may determine whether the object OBJ swings left-and-right according to a relative position between the outer frame center Bx_cnt and the farthest object pixel FOP corresponding to the video frames $FR_{i-K+1}$-$FR_i$. In an embodiment, when the determining unit 18 determines that the farthest object pixel FOP is on the left of the outer frame center Bx_cnt, the determining unit 18 determines that the object OBJ swings to the left (as an upper portion of FIG. 10). When the determining unit 18 determines that the farthest object pixel FOP is on the right of the outer frame center Bx_cnt, the determining unit 18 determines that the object OBJ swings to the right (as a bottom portion of FIG. 10). In an embodiment, when the determining unit 18 determines that the farthest object pixel FOP is on the left of the outer frame center Bx_cnt at a first time, and determines that the farthest object pixel FOP is on the right of the outer frame center Bx_cnt at a second time, in Step 342, the determining unit 18 determines that the object OBJ swings left-and-right, and generate a signal to instruct the electronic device 12 to perform operation(s) corresponding to a movement of swinging left-and-right, where a time difference between the first time and the second time is less than a specific value.

In addition, when the determining unit 18 determines that the object OBJ does not swings left-and-right, in Step 344, the determining unit 18 determines the gesture of the user as the clockwise waving movement or the counterclockwise waving movement. In an embodiment, the determining unit 18 may first determine whether the object OBJ moves like a circle according to the moving track TRK. If yes, the determining unit 18 then determines whether a waving direction of the object OBJ is clockwise or counterclockwise, so as to determine the gesture of the user as the clockwise waving movement or the counterclockwise waving movement, and generate a signal to instruct the electronic device 12 to perform operation(s) corresponding to the clockwise waving movement or the counterclockwise waving movement.

According to the gesture recognition process 30, the determining unit 18 is able to determine the gesture of the user as different movements, so as to generate the signal to instruct the electronic device 12 to perform the corresponding operations, which is to prevent mistaking trigger or mistaking determination among different movements and enhance an accuracy of the gesture recognition, so as to prevent the electronic device 12 from performing wrong operation.

Notably, the embodiments stated in the above are utilized for illustrating the concept of the present invention. Those skilled in the art may make modifications and alterations accordingly, and not limited herein. For example, when the determining unit 18 in Step 306 determines the time of the object OBJ staying within the plurality of video frames FR is less than or equal to the specific time, the determining unit 18 may determine a moving direction of the object OBJ according to the moving track TRK. After the moving direction of the object OBJ is determined as a first direction (e.g., moving upward), the determining unit 18 may set the delay flag DLF as 1 within a time t3, and set the delay flag DLF as 0 after the time t3. That is, the determining unit 18 would suspend determining the gesture of the user, so as to prevent from triggering unnecessary operation in the recovering movement when the user recovers back to original posture.

In addition, realization of the determining unit 18 is not limited. In an embodiment, the determining unit 18 may be an application-specific integrated circuit (ASIC). In another embodiment, the determining unit 18 may comprise a processing unit and a storage unit. The storage unit may be a non-volatile memory, e.g., an electrically erasable programmable read only memory (EEPROM) or a flash memory. The gesture recognition process 30 and the finger number determining process 60 may be compiled as a program code and stored in the storage unit.

In summary, according to the gesture recognition process of the present disclosure, the determining unit of the present disclosure may determine the gesture of the user as different movements, and generate the signal to instruct the electronic device to perform the corresponding operations, preventing mistaking a trigger or mistaking determination among different movements and enhance an accuracy of the gesture recognition, so as to prevent the electronic device from performing wrong operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A gesture recognition method, applied in a gesture recognition module, configured to determine a gesture of a user, wherein the gesture recognition module comprises a light sensing unit, and the light sensing unit generates a plurality of video frames, the gesture recognition method comprising:
   determining whether or not a time of an object staying within the plurality of video frames is greater than a specific time to generate a determination result;
   determining whether to determine a finger number corresponding to the object according to the determination result;
   determining the finger number corresponding to the object to generate a finger number determination result and determining whether or not the object moves away from the light sensing unit to generate an object moving-away determination result, when the time of the object staying within the plurality of video frames is greater than the specific time; and determining the gesture of the user according to the finger number determination result and the object moving-away determination result.

2. The gesture recognition method as claim 1, further comprising:
obtaining a binarized image corresponding to the object, wherein the binarized image comprises a plurality of object pixels and a plurality of background pixels, the plurality of object pixels have a first pixel value, and the plurality of background pixels have a second pixel value;
obtaining an outer frame of the object in the binarized image;
obtaining an outer frame center of the outer frame; and
determining a moving track of the object according to the outer frame center corresponding to the object.

3. The gesture recognition method as claim 2, wherein the step of determining the gesture of the user according to the finger number determination result and the object moving-away determination result comprises:
determining whether the object is static according to the moving track of the object when the finger number determination result indicates that the finger number is not 1;
when the object is static, determining in the binarized image whether or not the object enters the plurality of video frames horizontally;
when in the binarized image the object enters the plurality of video frames horizontally, determining the gesture of the user as a movement of shaking up-and-down on a side; and
when in the binarized image the object does not enter into the plurality of video frames horizontally, determining the gesture of the user as a movement of raising right hand or a movement of raising left hand.

4. The gesture recognition method as claim 3, wherein the step of determining the gesture of the user according to the finger number determination result and the object moving-away determination result comprises:
when the object is not static, determining whether the object moves vertically in constant speed; and
when the object moves vertically in constant speed, determining the gesture of the user as an upward movement in constant speed or a downward movement in constant speed.

5. The gesture recognition method as claim 4, wherein the step of determining the gesture of the user according to the finger number determination result and the object moving-away determination result comprises:
when the object does not move vertically in constant speed, determining whether the object swings left-and-right;
when the object swings left-and-right, determining the gesture of the user as a left-and-right swinging movement; and
when the object does not swing left-and-right, determining the gesture of the user as a clockwise waving movement of as a counterclockwise waving movement.

6. The gesture recognition method as claim 3, wherein the step of determining the gesture of the user according to the finger number determination result and the object moving-away determination result comprises:
when the object is not static and the object moving-away determination result indicates that the object moves away from the light sensing unit, determining the gesture of the user as a pushing movement; and after determining the gesture of the user as the pushing movement, temporarily stopping determining the gesture of the user.

7. The gesture recognition method as claim 2, wherein the step of determining the finger number corresponding to the object comprises:
obtaining a contour in the binarized image according to the plurality of object pixels and the plurality of background pixels;
calculating a transition number of a plurality of contour pixels of the contour with respect to a rotation angle corresponding to a contour center, wherein the transition number is related to a number of the plurality of contour pixels transiting from the first pixel value to the second pixel value and from the second pixel value to the first pixel value; and
determining the finger number of the object according to the transition number.

8. The gesture recognition method as claim 7, wherein the step of obtaining the contour comprises:
calculating a center point of the plurality of object pixels;
obtaining a farthest object pixel among the plurality of object pixels which is the farthest from the center point;
obtaining a first radius, wherein the first radius is related to a distance between the farthest object pixel and the outer frame center; and
obtaining the contour as a circle contour, wherein a center of the circle contour is the outer frame center, and a radius of the circle contour is the first radius.

9. The gesture recognition method as claim 1, wherein the step of determining the gesture of the user according to the finger number determination result comprises:
when the finger number determination result indicates that the finger number is 1, determining that the gesture of the user is corresponding to a single finger cursor operation.

10. The gesture recognition method as claim 1, further comprising:
when the finger number determination result indicates that the finger number is 1 and the object moving-away determination result indicates that the object moves away from the light sensing unit, determining that the gesture of the user is corresponding to a single finger cursor click operation; and
after determining that the gesture of the user is corresponding to the single finger cursor click operation, temporarily stopping determining the gesture of the user.

11. The gesture recognition method as claim 1, wherein the step of determining whether or not the object moves away from the light sensing unit to generate the object moving-away determination result comprises:
obtaining a plurality of depth values of the object corresponding to the plurality of video frames; and
determining whether or not the object moves away from the light sensing unit according to the plurality of depth values, to generate the object moving-away determination result.

12. The gesture recognition method as claim 1, further comprising:
when the time of the object staying within the plurality of video frames is not greater than the specific time, determining a moving direction of the object; and
after determining that the moving direction of the object is a first direction, temporarily stopping determining the gesture of the user.

13. A gesture recognition module, comprising:
a light emitting unit, configured to emit an incident light;
a light sensing unit, configured to receive a reflected light corresponding to the incident light, and generate a plurality of video frames according to the reflected light; and
a determining unit, coupled to the light sensing unit, configured to execute the following steps to determine a gesture of a user according to the plurality of video frames:
   determining whether or not a time of an object staying within the plurality of video frames is greater than a specific time to generate a determination result;
   determining whether to determine a finger number corresponding to the object according to the determination result;
   determining the finger number corresponding to the object to generate a finger number determination result and determining whether or not the object moves away from the light sensing unit to generate an object moving-away determination result, when the time of the object staying within the plurality of video frames is greater than the specific time; and
   determining the gesture of the user according to the finger number determination result and the object moving-away determination result.

14. The gesture recognition module as claim 13, wherein the determining unit is further configured to execute the following steps:
   obtaining a binarized image corresponding to the object, wherein the binarized image comprises a plurality of object pixels and a plurality of background pixels, the plurality of object pixels have a first pixel value, and the plurality of background pixels have a second pixel value;
   obtaining an outer frame of the object in the binarized image;
   obtaining an outer frame center of the outer frame; and
   determining a moving track of the object according to the outer frame center corresponding to the object.

15. The gesture recognition module as claim 14, wherein the determining unit is further configured to execute the following steps to determine the gesture of the user according to the finger number determination result and the object moving-away determination result:
   determining whether the object is static according to the moving track of the object when the finger number determination result indicates that the finger number is not 1;
   when the object is static, determining in the binarized image whether or not the object enters the plurality of video frames horizontally;
   when in the binarized image the object enters the plurality of video frames horizontally, determining the gesture of the user as a movement of shaking up-and-down on a side; and
   when in the binarized image the object does not enter into the plurality of video frames horizontally, determining the gesture of the user as a movement of raising right hand or a movement of raising left hand.

16. The gesture recognition module as claim 15, wherein the determining unit is further configured to execute the following steps to determine the gesture of the user according to the finger number determination result and the object moving-away determination result:
   when the object is not static, determining whether the object moves vertically in constant speed; and
   when the object moves vertically in constant speed, determining the gesture of the user as an upward movement in constant speed or a downward movement in constant speed.

17. The gesture recognition module as claim 16, wherein the determining unit is further configured to execute the following steps to determine the gesture of the user according to the finger number determination result and the object moving-away determination result:
   when the object does not move vertically in constant speed, determining whether the object swings left-and-right;
   when the object swings left-and-right, determining the gesture of the user as a left-and-right swinging movement; and
   when the object does not swing left-and-right, determining the gesture of the user as a clockwise waving movement of as a counterclockwise waving movement.

18. The gesture recognition module as claim 15, wherein the determining unit is further configured to execute the following steps to determine the gesture of the user according to the finger number determination result and the object moving-away determination result:
   when the object is not static and the object moving-away determination result indicates that the object moves away from the light sensing unit, determining the gesture of the user as a pushing movement; and
   after determining the gesture of the user as the pushing movement, temporarily stopping determining the gesture of the user.

19. The gesture recognition module as claim 14, wherein the determining unit is further configured to execute the following steps to determine the finger number corresponding to the object:
   obtaining a contour in the binarized image according to the plurality of object pixels and the plurality of background pixels;
   calculating a transition number of a plurality of contour pixels of the contour with respect to a rotation angle corresponding to a contour center, wherein the transition number is related to a number of the plurality of contour pixels transiting from the first pixel value to the second pixel value and from the second pixel value to the first pixel value; and
   determining the finger number of the object according to the transition number.

20. The gesture recognition module as claim 19, wherein the determining unit is further configured to execute the following steps to obtain the contour:
   calculating a center point of the plurality of object pixels;
   obtaining a farthest object pixel among the plurality of object pixels which is the farthest from the center point;
   obtaining a first radius, wherein the first radius is related to a distance between the farthest object pixel and the outer frame center; and
   obtaining the contour as a circle contour, wherein a center of the circle contour is the outer frame center, and a radius of the circle contour is the first radius.

21. The gesture recognition module as claim 13, wherein the determining unit is further configured to execute the following steps to determining the gesture of the user according to the finger number determination result:
   when the finger number determination result indicates that the finger number is 1, determining that the gesture of the user is corresponding to a single finger cursor operation.

22. The gesture recognition module as claim 13, wherein the determining unit is further configured to execute the following steps:

when the finger number determination result indicates that the finger number is 1 and the object moving-away determination result indicates that the object moves away from the light sensing unit, determining that the gesture of the user is corresponding to a single finger cursor click operation; and     after determining that the gesture of the user is corresponding to the single finger cursor click operation, temporarily stopping determining the gesture of the user.

23. The gesture recognition module as claim 13, wherein the determining unit is further configured to execute the following steps to determine whether or not the object moves away from the light sensing unit to generate the object moving-away determination result:

obtaining a plurality of depth values of the object corresponding to the plurality of video frames; and     determining whether or not the object moves away from the light sensing unit according to the plurality of depth values, to generate the object moving-away determination result.

24. The gesture recognition module as claim 13, wherein the determining unit is further configured to execute the following steps:

when the time of the object staying within the plurality of video frames is no greater than the specific time, determining a moving direction of the object; and     after determining that the moving direction of the object is a first direction, temporarily stopping determining the gesture of the user.

\* \* \* \* \*